US009154560B2

(12) United States Patent
Khorashadi et al.

(10) Patent No.: US 9,154,560 B2
(45) Date of Patent: Oct. 6, 2015

(54) METHOD AND SYSTEM FOR BUILDING ANNOTATION LAYERS BASED ON LOCATION AWARE USER CONTEXT INFORMATION

(75) Inventors: Behrooz Khorashadi, San Jose, CA (US); Saumitra Mohan Das, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 788 days.

(21) Appl. No.: 12/631,635

(22) Filed: Dec. 4, 2009

(65) Prior Publication Data

US 2011/0084804 A1 Apr. 14, 2011

Related U.S. Application Data

(60) Provisional application No. 61/250,844, filed on Oct. 12, 2009.

(51) Int. Cl.
*G08B 5/22* (2006.01)
*H04L 29/08* (2006.01)
(Continued)

(52) U.S. Cl.
CPC ............... *H04L 67/18* (2013.01); *G01C 21/00* (2013.01); *G01C 21/20* (2013.01); *G01C 21/206* (2013.01); *G01C 21/28* (2013.01); *G01C 21/30* (2013.01); *G01C 21/32* (2013.01); *H04W 4/02* (2013.01); *H04W 4/025* (2013.01); *H04W 4/028* (2013.01); *H04W 4/04* (2013.01); *H04W 4/043* (2013.01)

(58) Field of Classification Search
CPC ......... H04L 67/00; H04L 67/04; H04L 67/18; H04L 67/22; H04L 67/24; H04L 67/30; H04L 67/306; H04W 4/00; H04W 4/02; H04W 4/023; H04W 4/025; H04W 4/028; H04W 4/04; H04W 4/043; G01C 21/00; G01C 21/005; G01C 21/20; G01C 21/206; G01C 21/28; G01C 21/30; G01C 21/32
USPC .......... 340/8.1, 995.1–995.28, 539.2, 539.13; 455/456.1–456.6, 457, 414.4–414.3
See application file for complete search history.

(56) References Cited

U.S. PATENT DOCUMENTS 6,650,998 B1   11/2003   Rutledge et al.
6,732,120 B1 *  5/2004   Du ................................ 715/764
(Continued)

FOREIGN PATENT DOCUMENTS

CN   1475772 A    2/2004
CN   101369012 A  2/2009
(Continued)

OTHER PUBLICATIONS

International Search Report and Written Opinion—PCT/US2010/052058, International Search Authority—European Patent Office—Dec. 30, 2010.

(Continued)

*Primary Examiner* — Steven Lim
*Assistant Examiner* — Ryan Sherwin
(74) *Attorney, Agent, or Firm* — Arnold J. Gum

(57) ABSTRACT

The subject matter disclosed herein relates to a system and method for determining annotations for a map. Location information for mobile devices and contextual information associated with users of mobile devices may be utilized to determine such annotations.

49 Claims, 10 Drawing Sheets

(51) Int. Cl.
*G01C 21/20* (2006.01)
*G01C 21/00* (2006.01)
*H04W 4/04* (2009.01)
*G01C 21/28* (2006.01)
*H04W 4/02* (2009.01)
*G01C 21/32* (2006.01)
*G01C 21/30* (2006.01)

(56) References Cited

U.S. PATENT DOCUMENTS

| | | | |
|---|---|---|---|
| 6,885,362 B2 * | 4/2005 | Suomela | 345/156 |
| 7,139,252 B2 * | 11/2006 | Babu et al. | 370/312 |
| 7,873,465 B2 * | 1/2011 | Geelen et al. | 701/450 |
| 7,925,525 B2 * | 4/2011 | Chin | 705/7.19 |
| 8,264,584 B2 * | 9/2012 | Mukai et al. | 348/333.02 |
| 8,401,771 B2 * | 3/2013 | Krumm et al. | 701/115 |
| 8,526,406 B2 * | 9/2013 | Mikan et al. | 370/338 |
| 2007/0069923 A1 * | 3/2007 | Mendelson | 340/988 |
| 2007/0266055 A1 * | 11/2007 | Nomura | 707/200 |
| 2009/0036148 A1 * | 2/2009 | Yach | 455/457 |
| 2009/0176509 A1 | 7/2009 | Davis et al. | |
| 2009/0327134 A1 * | 12/2009 | Carlson et al. | 705/44 |
| 2010/0174998 A1 * | 7/2010 | Lazarus et al. | 715/751 |
| 2010/0289644 A1 * | 11/2010 | Slavin et al. | 340/568.1 |
| 2011/0046881 A1 * | 2/2011 | Karaoguz | 701/208 |

FOREIGN PATENT DOCUMENTS

| | | |
|---|---|---|
| JP | H07128427 A | 5/1995 |
| JP | 2004012319 A | 1/2004 |
| JP | 2006214826 A | 8/2006 |
| JP | 2007142534 A | 6/2007 |
| JP | 2007333998 A | 12/2007 |
| JP | 2009186219 A | 8/2009 |
| TW | 541471 B | 7/2003 |
| TW | 200638022 | 11/2006 |
| TW | 200825379 A | 6/2008 |
| TW | 200835233 A | 8/2008 |
| TW | 200923327 A | 6/2009 |
| TW | 200925556 A | 6/2009 |
| TW | 200935338 A | 8/2009 |
| WO | WO9202891 A1 | 2/1992 |
| WO | WO-03014670 A1 | 2/2003 |

OTHER PUBLICATIONS

Written Opinion—PCT/US2010/052058, International Search Authority, European Patent Office, Oct. 12, 2011.
Taiwan Search Report—TW099134768—TIPO—Aug. 12, 2013.

* cited by examiner

METHOD AND SYSTEM FOR BUILDING ANNOTATION LAYERS BASED ON LOCATION AWARE USER CONTEXT INFORMATION

CLAIM OF PRIORITY UNDER 35 U.S.C. §119

The present application for patent claims priority to Provisional Application No. 61/250,844 entitled "Explicit and Implicit Inference of Building Annotation Layers" filed Oct. 12, 2009, and assigned to the assignee hereof and hereby expressly incorporated by reference herein.

BACKGROUND

1. Field

The subject matter disclosed herein relates to annotations for a mapping application.

2. Information

A mobile device, such as a cell phone, personal digital assistant (PDA), or any other mobile wireless device may from time to time determine its location or position. A mobile device may include a graphical user interface or display for presenting a mapping application program. For example, such a mapping application program may present a map indicating a current location of a user's mobile device and various structures and/or topology in a surrounding area. In one example, a mapping application program may display a street-level map and a user's location on the map. A map may include various annotations, such as street names and/or names of various buildings/structures on the map. For example, a mapping application program may present one or more streets and buildings, such as a police station and public high school.

However, displaying structures, by themselves, may not provide sufficient information for a user to determine the identity of certain structures. For example, merely displaying structures of buildings on a high school campus may not provide enough information for a user of a mapping application to determine, for example, a name of the high school or the location of a principal's office within the high school. Some mapping application programs display certain labels on a map, such as a school name. A programmer may manually add such labels to a map and may periodically manually update such labels to reflect changes on a map.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
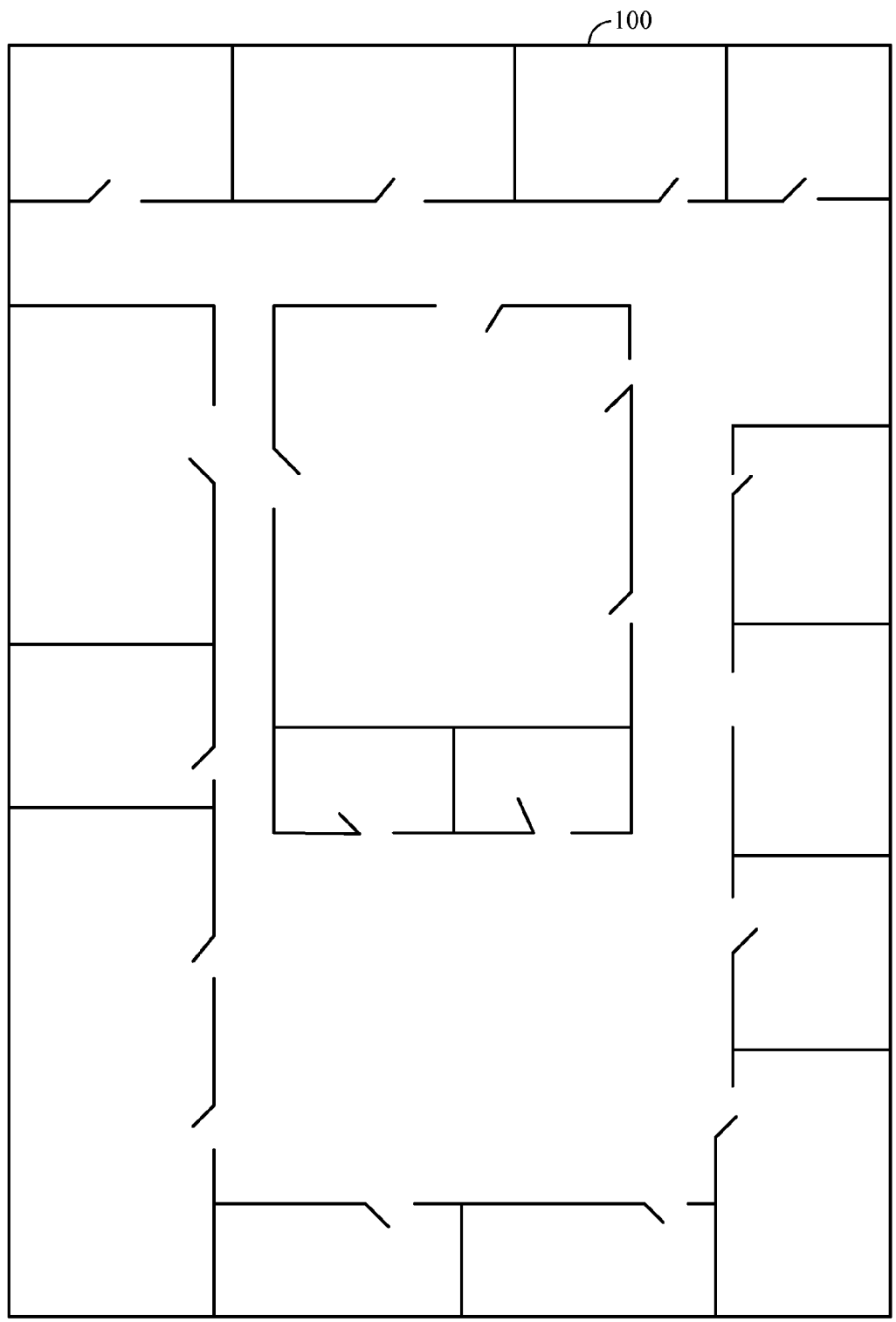
FIG. 1 illustrates a base map for one floor of an office building according to one implementation.

In one particular implementation, a system and method are provided for determining annotations for a map. One or more labels associated with one or more mobile devices located within an area may be determined, based at least in part on contextual information associated with at least one of the one or more mobile devices. The one or more labels may be grouped into one or more clusters, based at least in part on similarity of labels and location information and/or temporal information for the one or more mobile devices within the area. One or more annotations for a map corresponding to the area may be determined based at least in part on the one or more clusters of the one or more labels. It should be understood, however, that this is merely an example implementation and that claimed subject matter is not limited in this respect.

DETAILED DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Location-aware mobile devices, such as a cellular phone, personal digital assistant (PDA), or laptop computer may include a display screen for presenting information to a user. For example, a mapping application may be presented to a user. Such a mapping application may depict objects and/or structures within a given geographical area. For example, a map of a floor of a building may be presented to a user. However, such a map may be of limited value to a user unless it contains additional information, such as annotations. Such annotations may, for example, indicate names of various rooms and/or locations of a map. Annotations such as "Men's Restroom," "Conference Room A," or "Mr. Jones' Office" may be presented on features of a map.

In one implementation, a person, for example, a computer programmer, manually adds annotations to a map. For example, such a computer programmer may list names of various offices or rooms on a map. However, manually adding such annotations to a map may be very time-intensive and may require input from several different individuals to determine appropriate and relevant annotations for features of such a map.

In one implementation, a system may determine annotations for various objects depicted on a mapping application based on contextual information provided by one or more users of mobile devices. In one implementation, a particular user may be associated with both an email application program, or other calendaring program, and a particular mobile device. For example, such a user may utilize an email application program, such as Microsoft Outlook™, to maintain a calendar of meetings. Such an email application program may also send out group emails notifying users of certain meetings and locations for such meetings. For example, an email application program may include a calendar entry in the time period 2:00 PM-3:00 PM to indicate "Department Meeting in Conference Room A." Alternatively, a calendaring program independent from an email application program may be utilized to schedule meetings for a user.

A remote server or other device, for example, may contain an association between a particular user and the user's email and/or calendaring application program. Such a remote server or other device may also have information indicating one or more mobile devices that are also associated with a particular user. For example, a personal digital assistant (PDA), mobile phone, portable notebook, or another type of location-aware device may be associated with a user.

Information stored in a user's email and/or calendaring program may be utilized to determine annotations for a mapping application. For example, a base map for a floor of a building may be determined based on blueprints for the floor. Such a base map may display various walls, doors, fixtures, and/or enclosures located within a particular floor. However, such a base map may not initially contain annotations for the various rooms, offices, or other locations located within the particular floor. Such annotations may be determined for the map based on user context information.

"User context information," as used herein, may refer to location-related information associated with a particular user that may be used to determine one or more labels for a map. User context information may comprise, for example, information stored within an email and/or calendaring application program that indicates a location of a particular event. For example, a calendar entry for 2:00 PM-3:00 PM that includes the text "Meeting in Conference Room A" may be associated (e.g., spatially and temporally) with a determined location of the user during the period between 2:00 PM and 3:00 PM. Such an association may be used to determine a label for a location where a user is located at that time.

Other types of user context information may be determined based on an analysis of groupings of particular users as tracked throughout a designated time period. For example, if a cluster of users are determined to be within a particular room or location between around 12:00 PM and 12:45 PM on multiple days, it may be inferred that such users are located within a cafeteria and/or lunchroom at such time. Moreover, location information for a set of users may also be utilized to determine locations of restrooms and/or elevators or parking lots, for example.

A "label," as used herein may refer to a description associated with a particular room, area, or other feature of a map, based on user context information. In the event that several different users are each associated with their own unique email and/or calendaring application programs and location-aware devices, a label may be determined for each user based on each user's particular user context information. In one implementation, a cluster of the same or similar labels associated with the same room, for example, on a map may be utilized to determine an annotation to add to the map for the room. One or more pre-defined labels may be utilized to annotate certain commonly used areas, such as restrooms or a lunchroom/lunch area.

A "cluster," as used herein may refer to a grouping of two or more labels associated with different users for the same room, area, or other location of a map, based on user context information. For example, if the label for a particular room is determined to be "Conference Room A" for five different users, a system may determine that a room in which all five users are located at a particular time is, in fact, Conference Room A. An annotation may subsequently be appended to the room as presented on a mapping application. A cluster may be comprised of at least a minimum threshold number of users associating the same or similar labels with a particular room on a mapping application, for example. Labels may be grouped into a cluster. In some implementations, five users may be sufficient to form a cluster, whereas in other implementations, twenty users might be required to form a cluster, for example.

An "annotation," as used herein, may refer to a description added to a mapping application for a particular room, area, or other feature of a map, based on user context information. For example, in the event that a cluster is detected for a particular room on a mapping application, a description for the room may be appended to the mapping application. In some implementations, an annotation may be the same as one or more of the labels for a user in a cluster. In some implementations, different users may be associated with different labels for the same room. For example, a label, "Large Conference Room" may be determined based on user context information for a first user, whereas "Conference Room A" may be determined based on user context information for a second user. In the event that labels for users within a cluster differ slightly, an annotation may be determined based upon the most commonly used label within a cluster. For example, if four users are associated with the label, "Conference Room A," whereas only one user is associated with the label, "Large Conference Room," the annotation "Conference Room A" may be appended to the room as depicted within the mapping application.

FIG. 1 is a base map 100 for one floor of an office building according to one implementation. Base map 100 may comprise a map initially having no annotations or containing relatively few annotations. For example, in some implementations a base map 100 might initially show structural features including, for example, walls, partitions, doors, etc. Such a base map may also show a few annotations, such as an annotation to indicate a location of restrooms and/or a cafeteria, for example. However, annotations may be determined for one or more of the rooms, areas, or structures displayed on base map 100 over time based on user context information, such as, for example, information obtained from email and/or calendaring programs associated with particular users and respective locations of mobile devices associated with such users.

Figure 2:
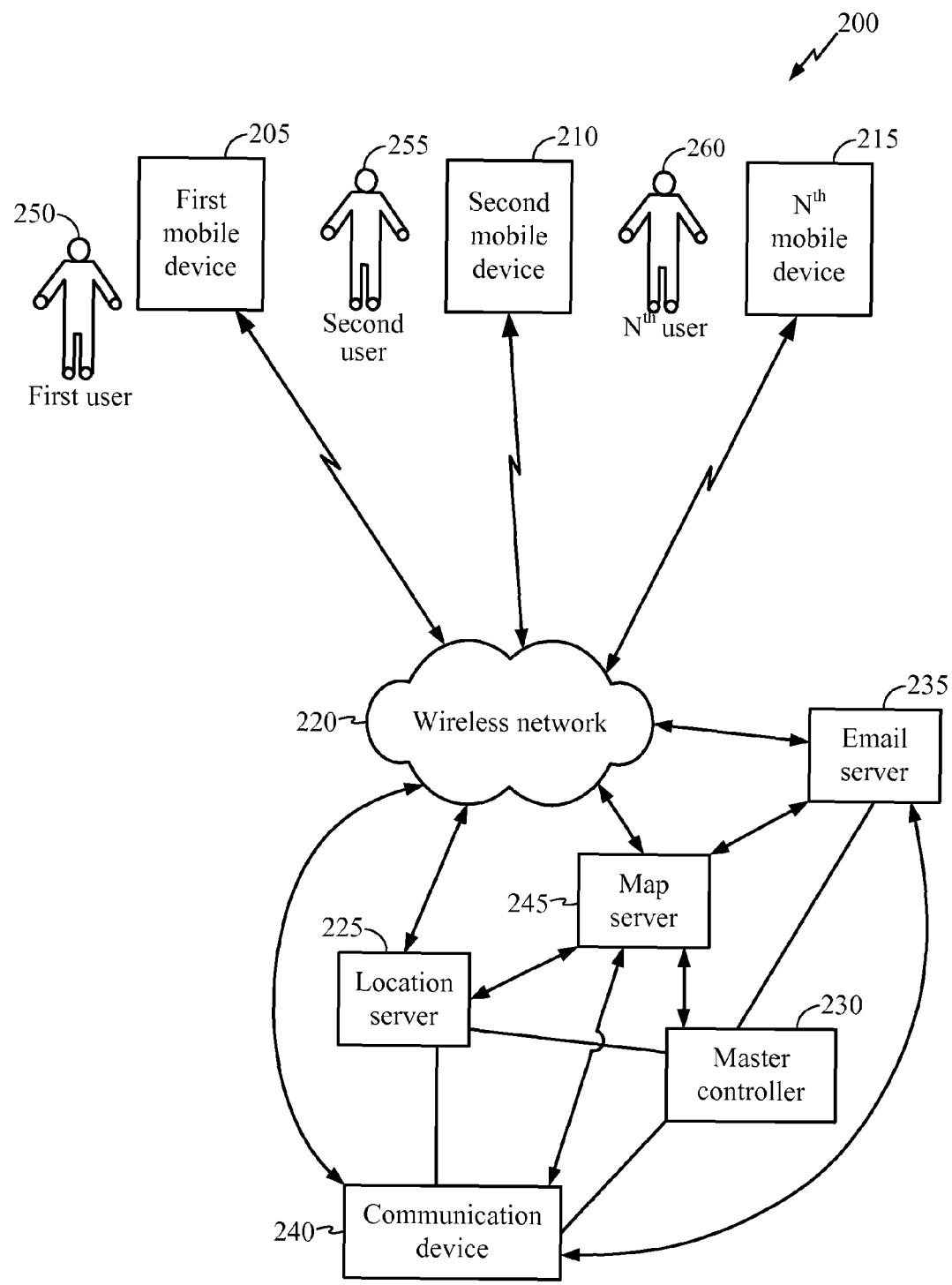
FIG. 2 illustrates a block diagram of a system for determining annotations for one or more maps of a mapping application according to one implementation.

FIG. 2 is a block diagram of a system 200 for determining annotations for one or more maps of a mapping application according to one implementation. System 200 may include one or more mobile devices to provide user context information, such as first mobile device 205, second mobile device 210, and additional mobile devices up to an Nth mobile device 215. A mobile device may periodically determine its location or position using any one of several known techniques, and may communicate its location or position to a location server 225 via a wireless network 220.

For example, a mobile device may identify its location based on navigation signals from a Satellite Positioning System (SPS), Wireless Local Area Network (WLAN), Machine Addressable Content (MAC) address, or Advanced Forward Link Trilateration (AFLT), or any other means for precisely determining a mobile device's location, to name just a few among many examples. In the event that such navigation signals are not available, on the other hand, such as within certain buildings or other structures, access points, femtocells, and/or other devices may be located throughout such an area at known locations and a mobile device may estimate ranges from the mobile device to particular devices such as access points. Thus, a mobile device located within an area where SPS navigation signals are unavailable may communicate with one or more wireless devices having known locations, such as earth-centered coordinates. Ranges from such a mobile device to one or more access points or other wireless devices may be measured, and an estimated location of such a mobile device may be computed using known techniques.

Location server 225 may maintain a list of mobile devices and their respective locations. A master controller 230 may control operation of location server 225, an email server 235, a communication device 240, and a map server 245. Master controller 230 may comprise a processing unit, a server, or a personal computer, just to name a few examples, and may be stand-alone or a part of another device. Communication device 240 may communicate, for example, with various mobile devices.

Email server 235 may host email and/or calendaring applications used by users of mobile devices. For example, first mobile device 205 may be associated with a first user 250, and email server 235 may host an email and/or calendaring application associated with first user 250. Similarly, email server 235 may host email and/or calendaring applications used by a second user 255 and additional users up through Nth user 260.

Map server 245 may store maps for various mapping applications used by mobile devices. For example, one mapping application may present a map having annotations on a display screen of a mobile device. Map server 245 may determine annotations for various rooms and/or areas on a map based on location information for a user and user context information, such as time entries stored in an email and/or calendaring application within email server 235.

Figure 3:
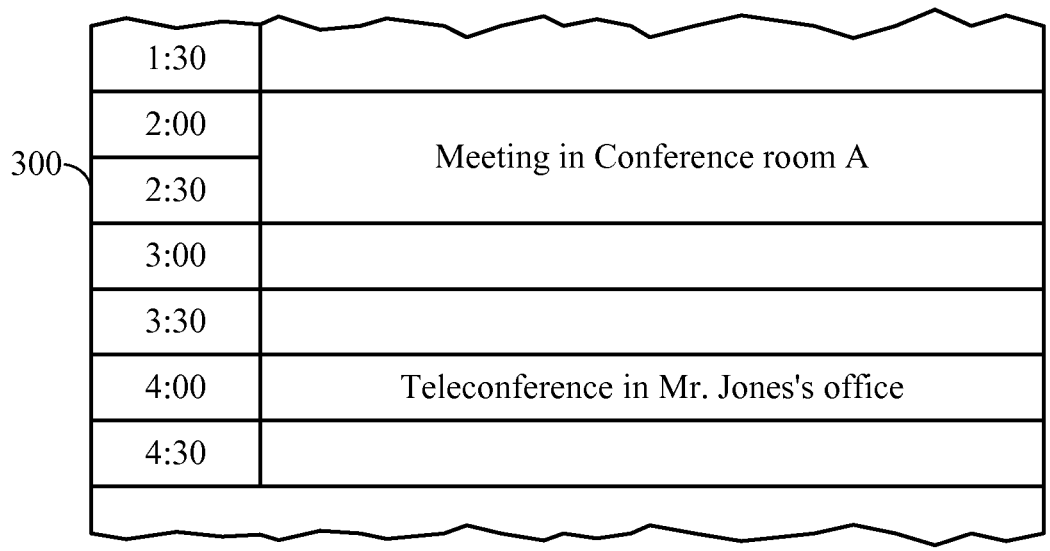
FIG. 3 illustrates a calendar of an email application program according to one implementation.

FIG. 3 illustrates a calendar 300 of an email application program according to one implementation. As shown, calendar 300 lists "Meeting in Conference Room A" between 2:00 PM and 3:00 PM and "Teleconference in Mr. Jones office" between 4:00 PM and 4:30 PM. Such entries may be utilized to determine annotations for a map, such as base map 100 shown in FIG. 1. Calendar 300 may be stored in an email server, such as email server 235 shown in FIG. 2.

Between 2:00 PM and 3:00 PM, a mobile device for a user associated with calendar 300 may periodically determine its location, for example, and provide such location information to a device, for example, a location server, such as location server 225 shown in FIG. 2. Such a device may receive location information from one or more mobile devices and/or contextual information associated with at least one of the one or more mobile devices. A master controller, such as master controller 230, may have access to both an email server, a location server, and a map server. Such a master controller may determine, based on information stored in location server 225, that there are multiple mobile devices within a particular room shown on a map at the same time. A master controller may utilize email server 235 to determine whether any users associated with such mobile devices have any calendar entries indicating where such users are scheduled to be at the time in question. For example, several of the users associated with mobile devices determined to be within the same room may have the same, or substantially the same entries, such as "Meeting in Conference Room A" as a calendar entry. A label may be determined for each user having a mobile device determined to be within the same room and for whom user context information is available, such as entries in a calendar of an email application program. If a cluster of the same or similar labels is determined to be present within the same room by a master controller, for example, an annotation for the room on a map may be determined to be "Conference Room A." After such an annotation has been determined, the annotation may be added to map server 245 to be added to one or more relevant maps displaying such a room.

A similar process may be utilized to determine annotations for other rooms and/or areas of a map. Over time, many annotations for a particular map may be determined. In some implementations, a master controller may periodically update annotations for a map over time to ensure that such annotations remain relevant and descriptive. For example, in the event that workers switch offices or are hired or fired, annotations indicating a person using a particular office may need to be updated periodically.

Figure 4:
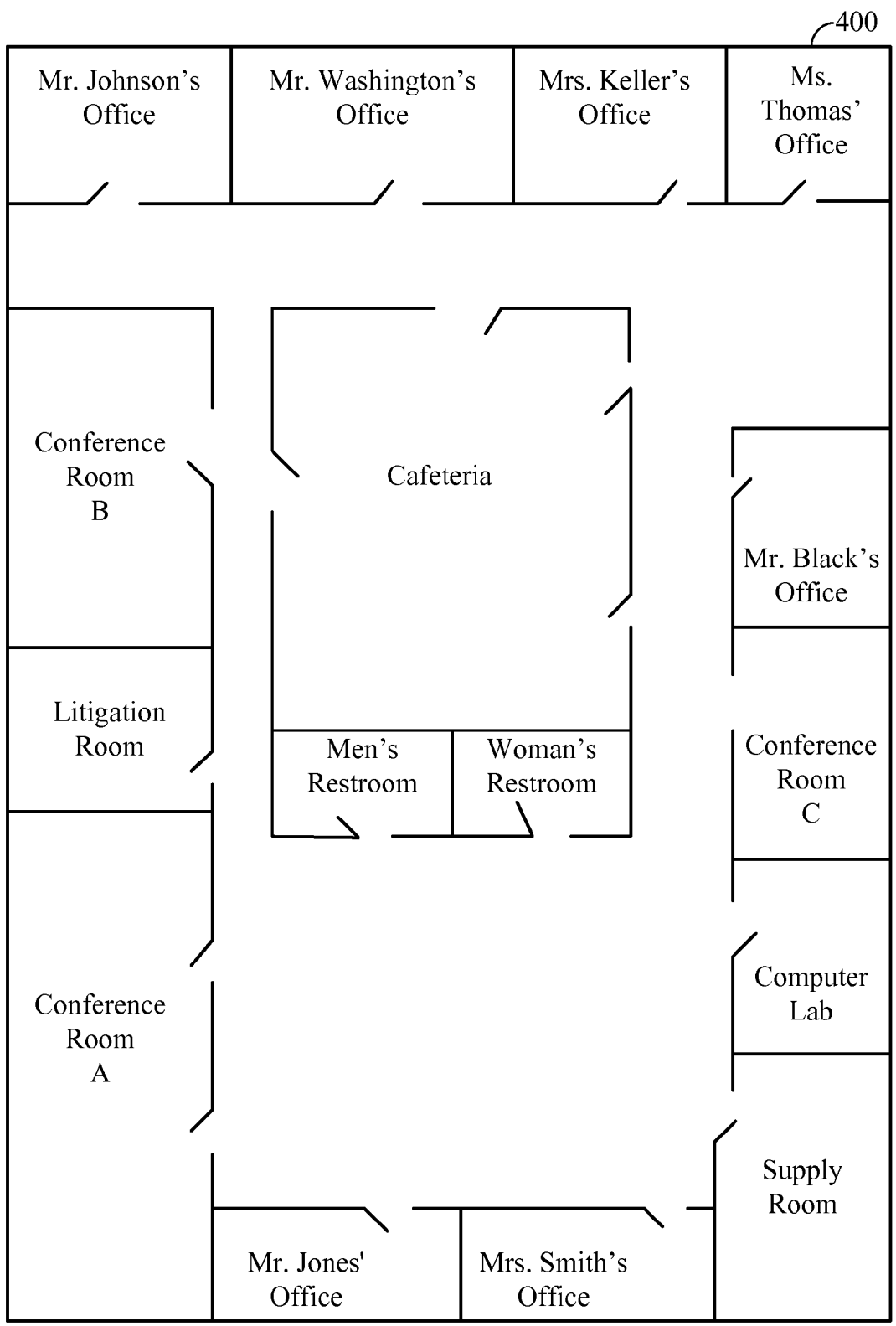
FIG. 4 illustrates an annotated map according to one implementation.

FIG. 4 is an annotated map 400 according to one implementation. Annotated map 400 may contain various annotations determined from user context information. For example, a base map 100 shown in FIG. 1 may resemble annotated map 400 after various annotations have been determined over time. As shown, annotated map 400 may include annotations for various rooms, such as "Conference Room A," "Mr. Jones' Office," "Mrs. Smith's Office," "Supply Room," "Computer Lab," "Conference Room C," "Mr. Black's Office," "Ms. Thomas' Office," "Mrs. Keller's Office," "Mr. Washington's Office," "Mr. Johnson's Office," "Conference Room B," "Litigation Room," "Cafeteria," "Men's Restroom," and "Women's Restroom," to name just a few among many possible annotations for annotated map 400. Such an annotated map 400 may provide a visual means for a user to view a map and readily determine the identities of various rooms and/or areas on the map.

There are additional ways to determine annotations for a map. In one particular implementation, Near Field Communication ("NFC") may be utilized. NFC comprises a short-range high frequency wireless communication technology which enables the exchange of data between devices over about a distance of, for example, 10.0 centimeters (around 4.0 inches). Possible applications of this technology include mobile ticketing in public transportation and mobile payment. For example, a device may act as a debit/credit payment card and smart poster. Such a device may also be used to read RFID tags on outdoor billboards in order to get info while on the move. Such information may be use to pin a user to a particular location at a particular time.

As an example, a user X may be in the subway and may use an NFC-enabled device to pay for and pass through a subway entrance gate for subway Line A. A user's mobile device may pick up this information and associate it with the mobile device's current location and may then upload such information to a location database. With respect to a calendar context association, for example, NFC may have a relatively low rate of probabilistic error because there is a high probability that a user is, in fact, next to a pay station at a subway. Such info may subsequently be used by future subway passengers that desire to get to Line A in a subway.

In one particular example, some users may utilize mobile devices that may have an ability to complete certain transactions, such as purchases. For example, a user may utilize such a mobile device to purchase an item from a merchant. During such a transaction, information identifying a merchant may be provided to the mobile device and may be utilized to determine an annotation for a map, as discussed below.

Figure 5:
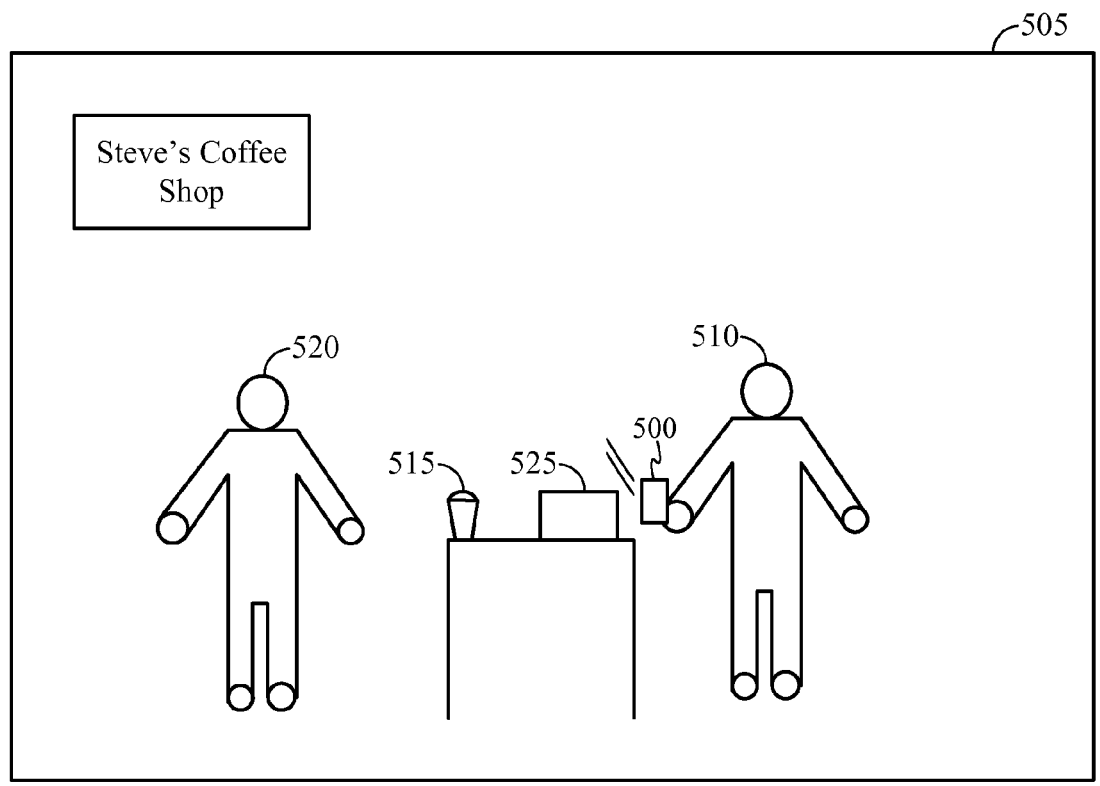
FIG. 5 illustrates a merchant transaction completed with a mobile device at a merchant according to one implementation.

FIG. 5 illustrates a merchant transaction completed with a mobile device 500 at a merchant 505 according to one implementation. In this example, a user 510 enters a merchant 505, which in this case is a coffee shop named "Steve's Coffee Shop," to purchase a cup of coffee 515. A clerk 520 completes the transaction by instructing user 510 to position mobile device 500 within close proximity of a merchant transaction device 525. In one example, mobile device 500 may identify itself to merchant transaction device 525, which may subsequently access a remote server to receive an electronic payment. During such a transaction, merchant transaction device 525 may identify itself to mobile device 500. For example, merchant transaction device 525 may send a message to mobile device 500 indicating that the name of merchant 505 is "Steve's Coffee Shop." Mobile device 500 may subsequently provide the name of merchant 505 and a location where such a transaction took place to a master controller or location server, for example. A master controller may utilize such information to provide an annotation "Steve's Coffee Shop" to an area of a map associated with the determined location.

Figure 6:
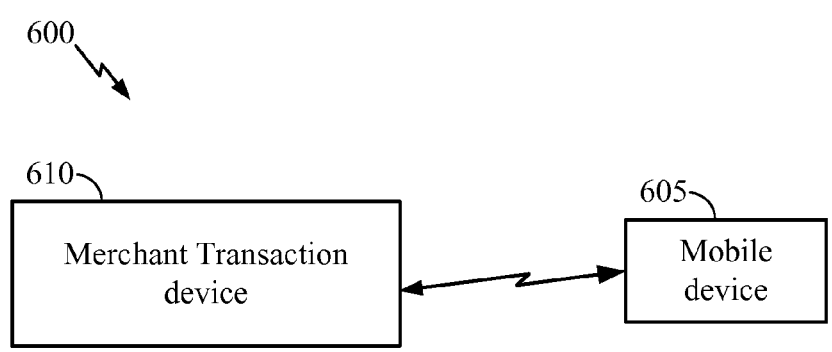
FIG. 6 illustrates a system for completing a merchant transaction with a mobile device according to one implementation.

FIG. 6 illustrates a system 600 for completing a merchant transaction with a mobile device 605 according to one implementation. As shown, mobile device 605 may communicate with a merchant transaction device 610 via wireless communication. In some implementations, a hard-wired connection between mobile device 605 and merchant transaction device 610 may instead be utilized to exchange information.

Figure 7:
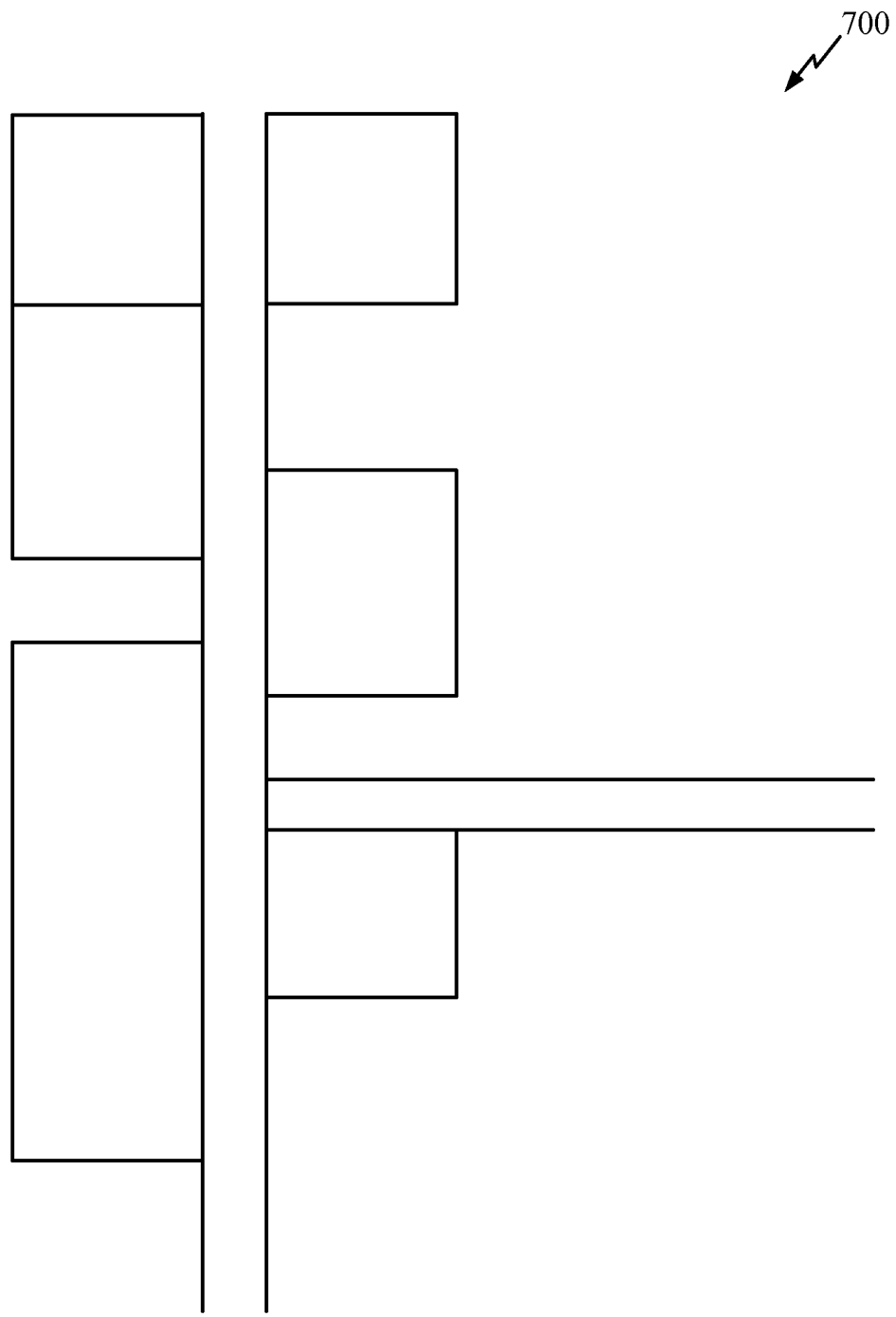
FIG. 7 illustrates a base map showing various merchants in an area according to one implementation.

FIG. 7 is a base map 700 showing various merchants in an area according to one implementation. As shown, base map 700 illustrates various structures but lacks annotations. Such annotations may be added over time as mobile devices complete transactions with merchant transaction devices.

Figure 8:
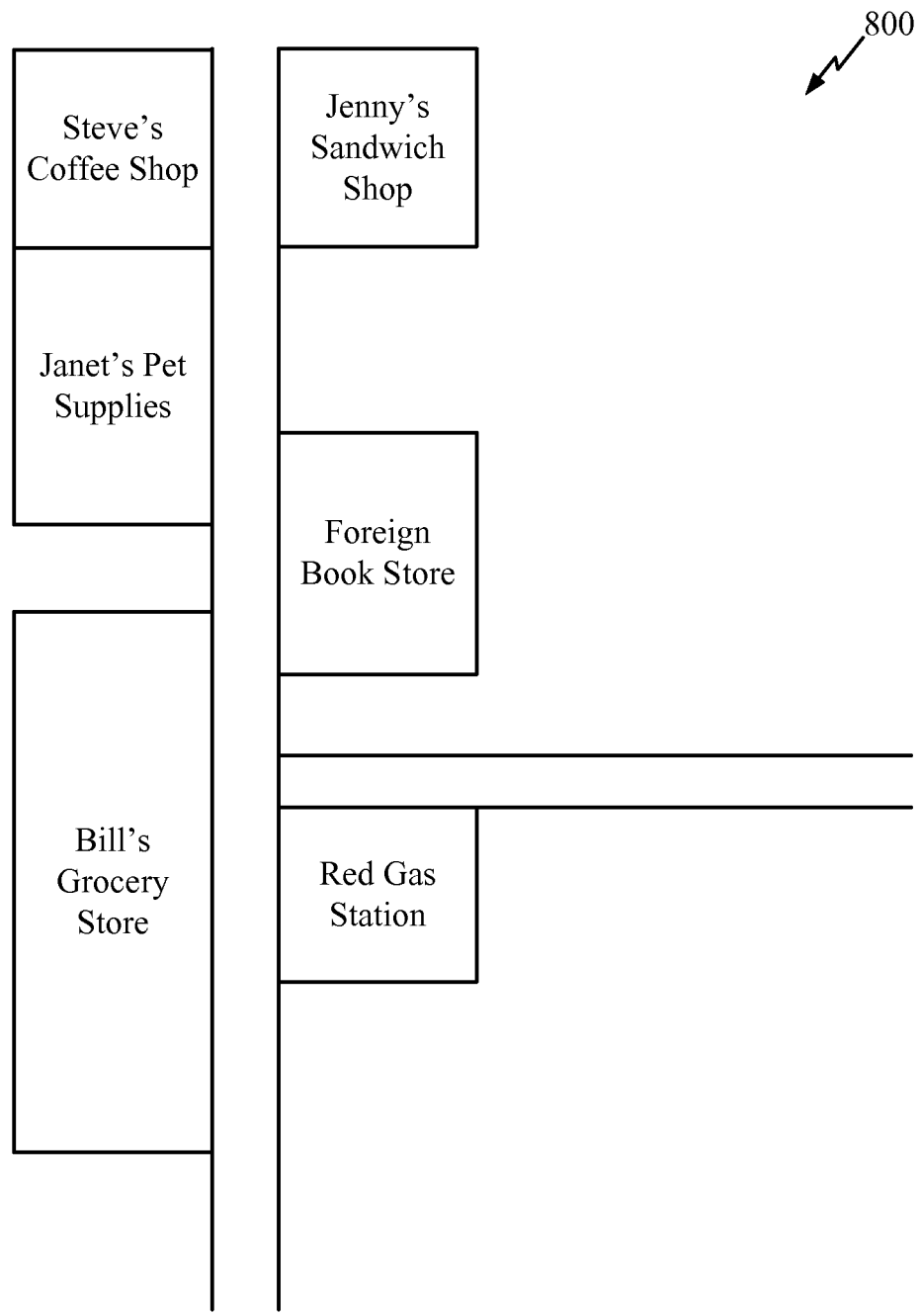
FIG. 8 illustrates an annotated map showing various merchants in an area according to one implementation.

FIG. 8 is an annotated map 800 showing various merchants in an area according to one implementation. As shown, annotated map 800 illustrates various structures and annotations. Such annotations may be determined based on transactions completed between mobile devices and merchant transaction devices, such as those discussed above with respect to FIGS. 5-6. In this example, annotated map 800 includes annotations such as "Steve's Coffee Shop," "Janet's Pet Supplies," "Bill's Grocery Store," "Jenny's Sandwich Shop," "Foreign Book Store," and "Red Gas Station," to name a few among many possible annotations for annotated map 800.

It should be appreciated that an annotation for a map may be determined based on a label received from a single mobile device in the examples discussed above with respect to FIGS. 5-8. Because names of merchants may be provided to mobile devices during completion of transactions, there is a relatively high probability that information regarding a merchant's name provided during a transaction is likely to be accurate. On the other hand, labels from several mobile devices may be required in some implementations to determine annotations for maps discussed above with respect to FIGS. 1-4 because there is a chance that a meeting indication on a calendar in an email and/or mapping application may be inaccurate, for example, because a meeting has been cancelled, moved to a different room than the one indicated in a calendar entry, or a user may have decided not to attend such a meeting.

In some implementations, a base map for structures may not be available to which to add annotations. Instead, a blank map may be utilized that does not show any or all structures for a given geographical area. For example, if students of a university utilize email and/or other calendaring application programs to keep track of class and/or activity schedules, annotations may be determined for a blank map.

Figure 9:
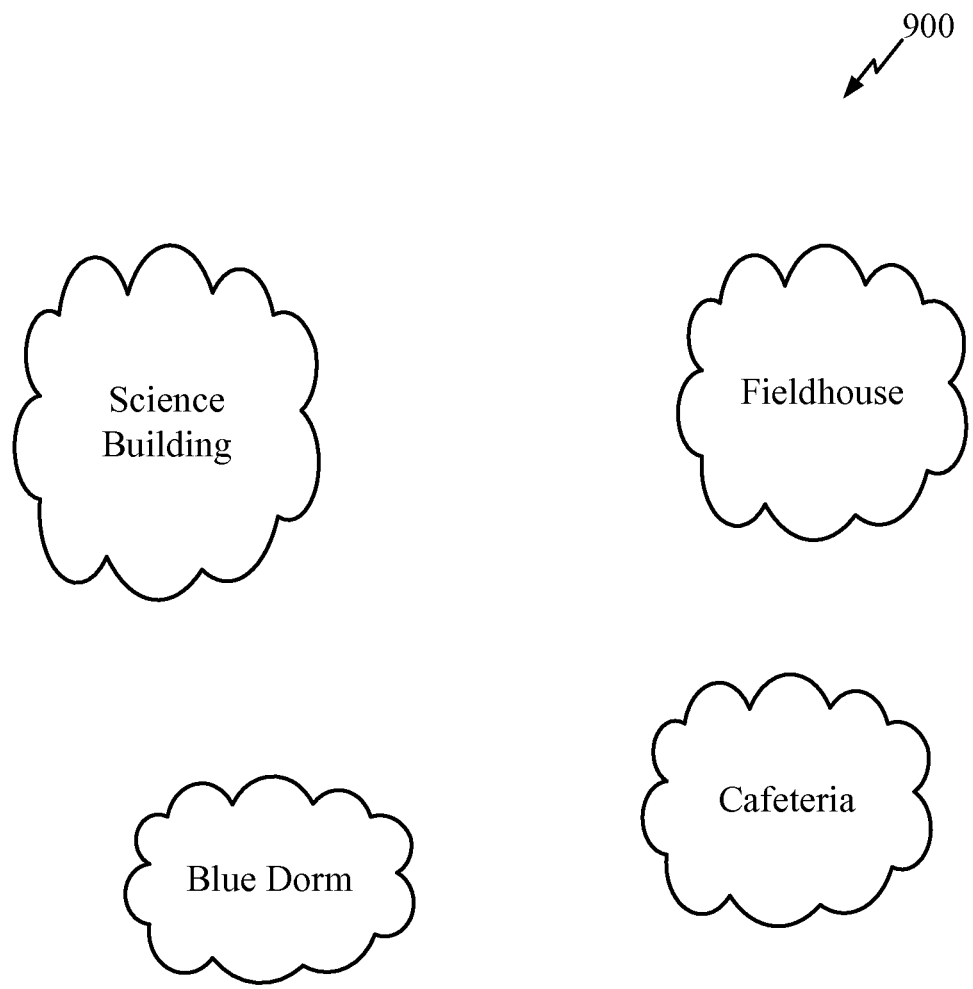
FIG. 9 illustrates an annotated map according to one implementation.

FIG. 9 is an annotated map 900 according to one implementation. In this example, annotated map 900 does not present any structures. However, based on locations determined by various mobile devices carried by university students, for example, annotations for certain buildings, rooms, and/or other areas may be determined. For example, there may be several students carrying mobile devices to classes within a science building. Accordingly, the annotation "Science Building" may be added to an area of annotated map 900 corresponding to locations were such mobile devices are determined to be at a particular time corresponding to calendar entries in an email and/or calendaring program. Similarly, annotations for "Fieldhouse," "Blue Dorm," and "Cafeteria" may also be determined. Alternatively, a system may include a group of pre-defined labels, such as "Fieldhouse," "Blue Dorm," and "Cafeteria" which may be added to a map as annotations based on monitored patterns of movement indicative of one or more of such pre-defined labels. Monitoring location information for a group of mobile devices (e.g., a pre-defined group of mobile devices) may help to determine patterns indicative of one or more pre-defined labels.

Figure 10:
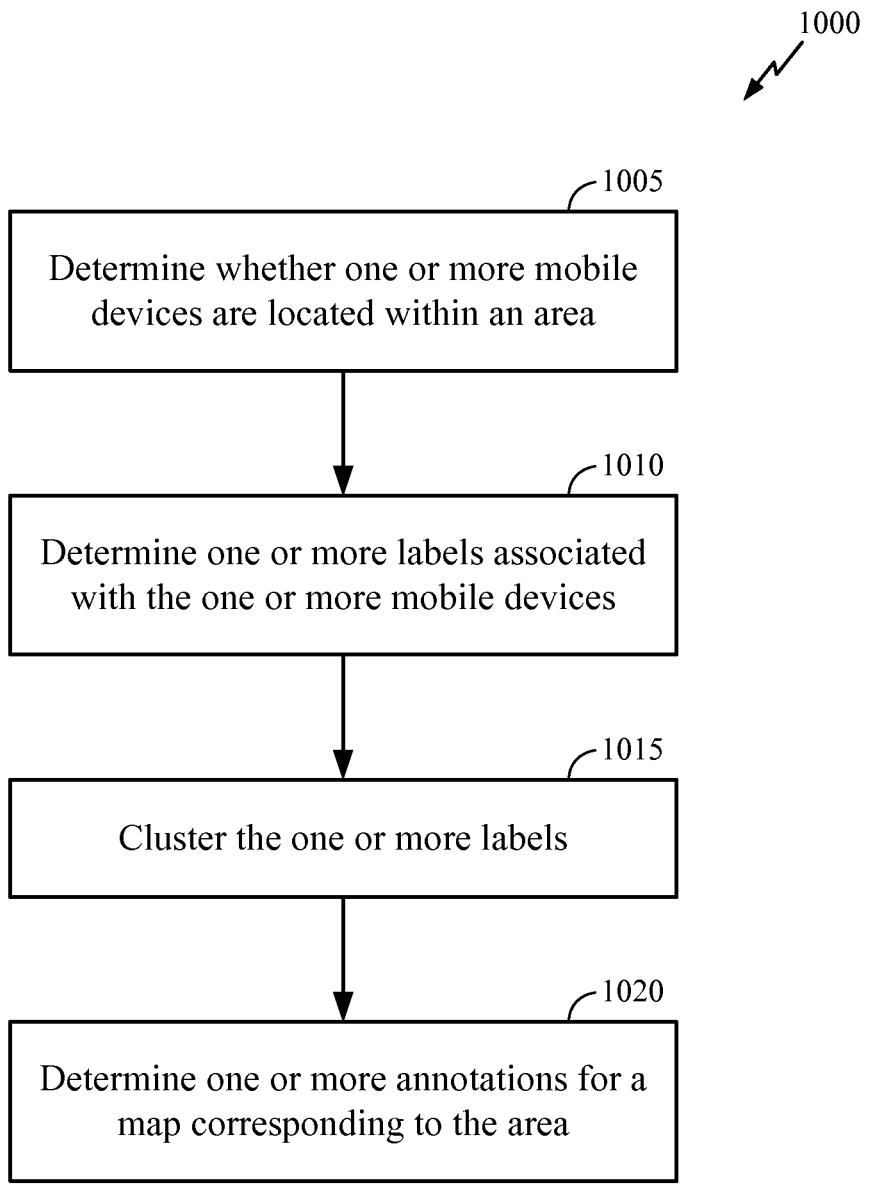
FIG. 10 illustrates a flow diagram illustrating a process for determining annotations for a map according to one implementation.

FIG. 10 is a flow diagram illustrating a process 1000 for determining annotations for a map according to one implementation. First, at operation 1005, a determination is made regarding whether one or more mobile devices are located within a certain area. In some implementations, a determination may be made regarding proximity between each of such mobile devices. Next, at operation 1010, one or more labels associated with the one or more mobile devices located within the area are determined, based at least in part on contextual information associated with the one or more mobile devices. The contextual information may comprise one or more calendar notations associated with a user of a mobile device, merchant transaction information associated with a merchant, at least an identity of a merchant where a transaction between a mobile device and the merchant occurs, one or more minimum threshold amounts for one or more clusters, one or more pre-defined labels, and/or etc. At operation 1015, such labels may be grouped into one or more clusters, based at least in part on similarity of labels and location information and temporal information for the one or more mobile devices within the area. Temporal information may be utilized, for example, to ensure that annotations are determined for users associated with mobile devices that may be located within the same general area at the same time, according to some implementations. Finally, at operation 1020, one or more annotations may be determined for a map corresponding to the area based at least in part on clustering of the one or more labels.

Process 1000 described above with respect to FIG. 10 may be performed by a master controller, such as master controller 230 discussed above with respect to FIG. 2.

Circuitry, such as transmitters and/or receivers may provide functionality, for example, through the use of various wireless communication networks such as a wireless wide area network (WWAN), a wireless local area network (WLAN), a wireless personal area network (WPAN), and so on. The terms "network" and "system" are often used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Communications (GSM), Digital Advanced Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. The techniques may be implemented for use with an Ultra Mobile Broadband (UMB) network, a High Rate Packet Data (HRPD) network, a CDMA2000 1x network, GSM, Long-Term Evolution (LTE), and/or the like.

Figure 11:
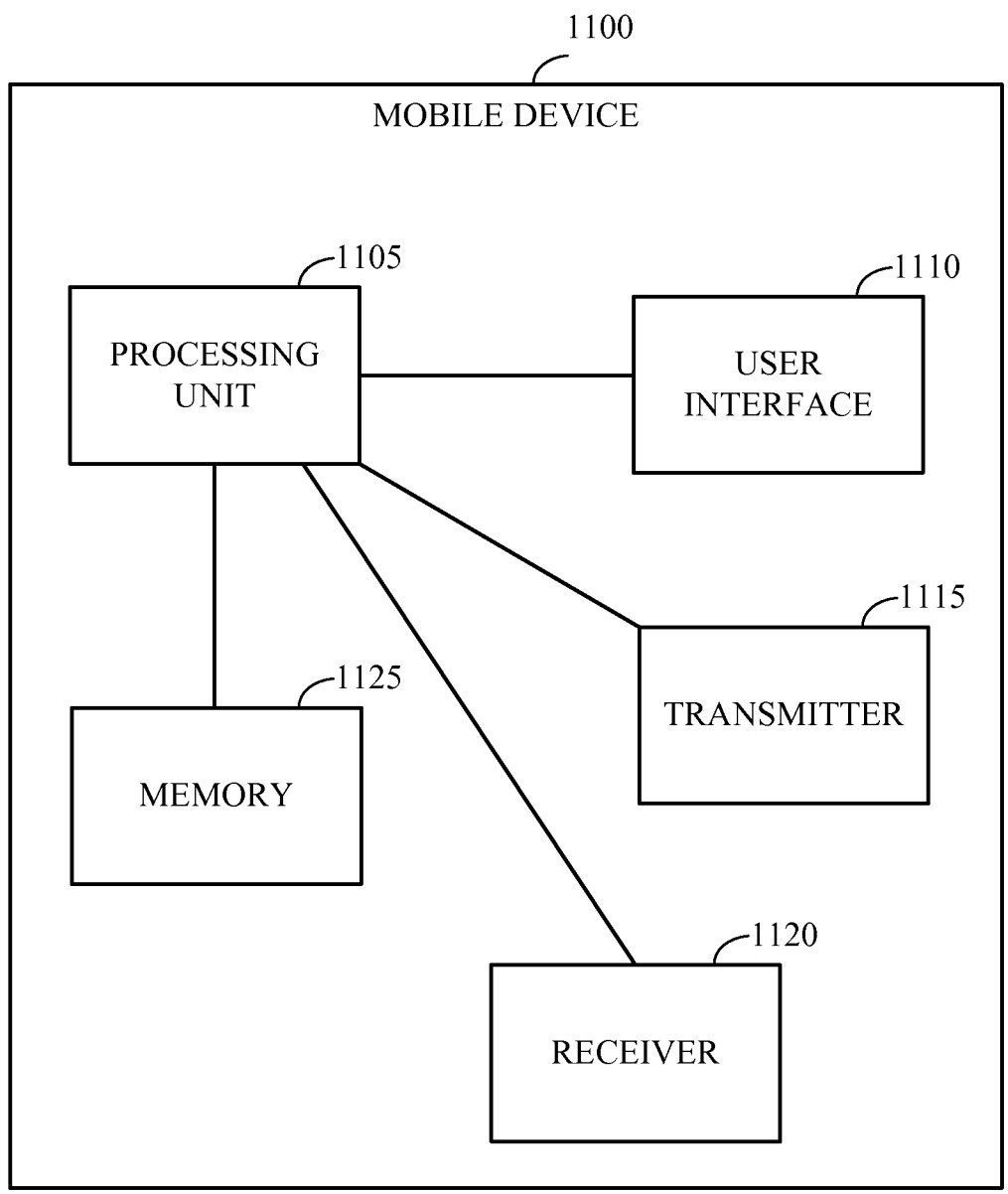
FIG. 11 illustrates a schematic block diagram of a particular implementation of a mobile device according to one implementation.

FIG. 11 is a schematic block diagram of a particular implementation of a mobile device 1100 according to one implementation. Mobile device 1100 may comprise a mobile station (MS) in which a radio transmitter may be adapted to modulate an RF carrier signal with baseband information, such as voice or data, onto an RF carrier, and a radio receiver may demodulate a modulated RF carrier to obtain such baseband information.

Mobile device 1100 may include several elements such as processing unit 1105, user interface 1110, transmitter 1115, receiver 1120, and memory 1125. User interface 1110 may comprise a plurality of devices for inputting or outputting user information such as voice or data. Such devices may include, for example, a keyboard, a display screen, a microphone, a speaker, buttons and knobs, just to name a few examples. User interface 1110 may present a map to a user.

Memory 1125 may be adapted to store machine-readable instructions, which are executable to perform one or more of processes, examples, or implementations thereof which have been described or suggested. Processing unit 1105 may be adapted to access and execute such machine-readable instructions. Through execution of these machine-readable instructions, processing unit 1105 may direct various elements of mobile device 1100 to perform one or more functions.

Transmitter 1115 may utilize an antenna to transmit communications, such as packet-based communications to other wireless devices. Receiver 1120 may also utilize such an antenna to receive communications, such as packet-based communications from other wireless devices.

Some portions of the detailed description are presented in terms of algorithms or symbolic representations of operations on binary digital signals stored within a memory of a specific apparatus or special purpose computing device or platform. In the context of this particular specification, the terms specific apparatus, special purpose computing device, or the like include a processing unit/general purpose computer programmed to perform particular functions pursuant to instructions from program code. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. For example, a specific computing apparatus may comprise one or more processors programmed with instructions to perform one or more specific functions.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For a firmware and/or software implementations, certain methodologies may be implemented with modules (e.g., procedures, functions, and so on) that perform the functions described herein. Any machine readable medium tangibly embodying instructions may be used in implementing the methodologies described herein. For example, software codes may be stored in a memory of a mobile station and/or an access point/femtocell and executed by a processing unit of the device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. A computer-readable medium may take the form of an article of manufacture. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In addition to global systems (e.g., GNSS), SPS may include various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method, comprising:
    determining a plurality of labels descriptive of two or more different areas within an indoor environment based at least in part on a combination of contextual information for at least two individual ones of two or more mobile devices located within at least one of the two or more different areas within a time range for a scheduled event, wherein the contextual information comprises a description of the scheduled event and the time range for the scheduled event, and wherein the two or more different areas are depicted on a previously unannotated portion of a map, at least a first mobile device of the two or more mobile devices being located within a first area of the two or more different areas within the time range and at least a second of the two or more mobile devices being located within a second area of the two or more different areas within the time range;
    grouping the plurality of labels into two or more clusters, based, at least in part, on location information and temporal information for the at least two individual ones of the two or more mobile devices located within the at least one of the two or more different areas, and based further in part on a similarity between or among the plurality of labels;
    determining at least a first map annotation descriptive of the first area of the two or more different areas and at least a second map annotation descriptive of the second area of the two or more different areas based at least in part on the two or more clusters of the plurality of labels; and
    initiating display of at least a portion of the map and of the at least a first map annotation or of the at least a second map annotation.

2. The method of claim 1, wherein the contextual information comprises one or more calendar notations associated with a user of a particular mobile device of the two or more mobile devices.

3. The method of claim 2, further comprising determining a label for the particular mobile device based at least in part on the one or more calendar notations corresponding to a specified time.

4. The method of claim 3, further comprising associating the label for the particular mobile device with location information for the particular mobile device determined at the specified time.

5. The method of claim 1, wherein the contextual information comprises merchant transaction information associated with a merchant.

6. The method of claim 1, wherein the contextual information comprises at least an identity of a merchant where a transaction between a particular mobile device of the two or more mobile devices and the merchant occurs.

7. The method of claim 1, wherein the contextual information comprises one or more minimum threshold amounts for one or more clusters.

8. The method of claim 1, wherein the contextual information comprises one or more pre-defined labels.

9. The method of claim 8, wherein at least one of the one or more pre-defined labels comprises a label indicative of a lunch area.

10. The method of claim 8, wherein at least one of the one or more pre-defined labels comprises a label indicative of a restroom.

11. The method of claim 8, further comprising monitoring location information for a pre-defined group of the two or more mobile devices to determine patterns indicative of the one or more pre-defined labels.

12. The method of claim 1, further comprising receiving the location information from the at least one of the two or more mobile devices.

13. The method of claim 1, further comprising receiving the contextual information associated with the two or more mobile devices.

14. The method of claim 1, wherein the method is performed by a special purpose computing device executing instructions.

15. An apparatus, comprising:
a communication interface to receive signals from at least two individual ones of two or more mobile devices located within at least one of two or more different areas; and
a special purpose computing device programmed with instructions to:
determine a plurality of labels descriptive of the two or more different areas based at least in part on a combination of contextual information for the at least two individual ones of the two or more mobile devices located within at least one of the two or more different areas within a time range for a scheduled event, wherein the contextual information comprises a description of the scheduled event and the time range for the scheduled event, and wherein the two or more different areas are depicted on a previously unannotated portion of a map, at least a first mobile device of the two or more mobile devices being located within a first area of the two or more different areas within the time range and at least a second of the two or more mobile devices being located within a second area of the two or more different areas within the time range;
group the plurality of labels into two or more clusters, based, at least in part, on location information and temporal information for the at least two individual ones of the two or more mobile devices located within the at least one of the two or more different areas, and based further in part on a similarity between or among the plurality of labels;
determine at least a first map annotation descriptive of the first area of the two or more different areas and at least a second map annotation descriptive of the second area of the two or more different areas based at least in part on the two or more clusters of the plurality of labels; and
initiate display of at least a portion of the map and of the at least a first map annotation or of the at least a second map annotation.

16. The apparatus of claim 15, wherein the contextual information comprises one or more calendar notations associated with a user of a particular mobile device of the two or more mobile devices.

17. The apparatus of claim 16, wherein a label for the particular mobile device is based at least in part on the one or more calendar notations corresponding to a specified time.

18. The apparatus of claim 17, wherein the instructions, in response to being executed by the special purpose computing device, direct the special purpose computing device to associate the label for the particular mobile device with location information for the particular mobile device determined at the specified time.

19. The apparatus of claim 15, wherein the contextual information comprises merchant transaction information associated with a merchant.

20. The apparatus of claim 15, wherein the contextual information comprises at least an identity of a merchant where a transaction between a particular mobile device and the merchant occurs.

21. The apparatus of claim 15, wherein the contextual information comprises one or more pre-defined labels.

22. The apparatus of claim 21, wherein the contextual information comprises one or more minimum threshold amounts for the two or more clusters.

23. The apparatus of claim 21, wherein at least one of the one or more pre-defined labels comprises a label indicative of a lunch area.

24. The apparatus of claim 21, wherein at least one of the one or more pre-defined labels comprises a label indicative of a restroom.

25. The apparatus of claim 21, wherein the instructions, in response to being executed by the special purpose computing device, direct the special purpose computing device to monitor location information for a pre-defined group of the two or more mobile devices to determine patterns indicative of one or more of the one or more pre-defined labels.

26. An apparatus, comprising:
means for determining a plurality of labels descriptive of two or more different areas within an indoor environment based at least in part on a combination of contextual information for at least two individual ones of two or more mobile devices located within at least one of the two or more different areas within a time range for a scheduled event, wherein the contextual information comprises a description of the scheduled event and the time range for the scheduled event, and wherein the two or more different areas are depicted on a previously unannotated portion of a map, at least a first mobile device of the two or more mobile devices being located within a first area of the two or more different areas within the time range and at least a second of the two or more mobile devices being located within a second area of the two or more different areas within the time range;

means for grouping the plurality of labels into two or more clusters, based, at least in part, on location information and temporal information for the at least two individual ones of the two or more mobile devices located within the at least one of the two or more different areas, and based further in part on a similarity between or among the plurality of labels;

means for determining at least a first map annotation descriptive of the first area of the two or more different areas and at least a second map annotation descriptive of the second area of the two or more different areas based at least in part on the two or more clusters of the plurality of labels; and means for initiating display of at least a portion of the map and of the at least a first map annotation or of the at least a second map annotation.

27. The apparatus of claim 26, wherein the contextual information comprises one or more calendar notations associated with a user of a particular mobile device of the two or more mobile devices.

28. The apparatus of claim 27, wherein a label for the particular mobile device is based at least in part on the one or more calendar notations corresponding to a specified time.

29. The apparatus of claim 28, further comprising means for associating the label for the particular mobile device with location information for the particular mobile device determined at the specified time.

30. The apparatus of claim 26, wherein the contextual information comprises merchant transaction information associated with a merchant.

31. The apparatus of claim 26, wherein the contextual information comprises at least an identity of a merchant where a transaction between a particular mobile device and the merchant occurs.

32. The apparatus of claim 26, wherein the contextual information comprises one or more pre-defined labels.

33. The apparatus of claim 26, wherein the contextual information comprises one or more minimum threshold amounts for the two or more clusters.

34. The apparatus of claim 32, wherein at least one of the one or more pre-defined labels comprises a label indicative of a lunch area.

35. The apparatus of claim 32, wherein at least one of the one or more pre-defined labels comprises a label indicative of a restroom.

36. The apparatus of claim 32, further comprising means for monitoring location information for a pre-defined group of the two or more mobile devices to determine patterns indicative of the one or more pre-defined labels.

37. The apparatus of claim 26, further comprising means for receiving the location information for the two or more mobile devices.

38. The apparatus of claim 26, further comprising means for receiving the contextual information associated with the two or more mobile devices.

39. An article comprising: a non-transitory storage medium having stored thereon instructions executable by a special purpose apparatus to:

determine a plurality of labels descriptive of two or more different areas within an indoor environment based at least in part on a combination of contextual information for at least two individual ones of two or more mobile devices located within at least one of the two or more different areas within a time range for a scheduled event, wherein the contextual information comprises a description of the scheduled event and the time range for the scheduled event, and wherein the two or more different areas are depicted on a previously unannotated portion of a map, at least a first mobile device of the two or more mobile devices being located within a first area of the two or more different areas within the time range and at least a second of the two or more mobile devices being located within a second area of the two or more different areas within the time range;

group the plurality of labels into two or more clusters, based at least in part on location information and temporal information for the at least two individual ones of the two or more mobile devices located within the at least one of the two or more different areas, and based further in part on a similarity between or among the plurality of labels;

determine at least a first map annotation descriptive of the first area of the two or more different areas and at least a second map annotation descriptive of the second area of the two or more different areas based at least in part on the two or more clusters of the plurality of labels; and initiating display of at least a portion of the map and of the at least a first map annotation or of the at least a second map annotation.

40. The article of claim 39, wherein the contextual information comprises one or more calendar notations for a user of a particular mobile device of the two or more mobile devices.

41. The article of claim 40, wherein a label for the particular mobile device is based at least in part on the one or more calendar notations corresponding to a specified time.

42. The article of claim 41, wherein the instructions are further executable by the special purpose apparatus to associate the label for the particular mobile device with location information for the particular mobile device determined at the specified time.

43. The article of claim 39, wherein the contextual information comprises merchant transaction information associated with a merchant.

44. The article of claim 39, wherein the contextual information comprises at least an identity of a merchant where a transaction between a particular mobile device and the merchant occurs.

45. The article of claim 39, wherein the contextual information comprises one or more minimum threshold amounts for the two or more clusters.

46. The article of claim 39, wherein the contextual information comprises one or more pre-defined labels.

47. The article of claim 46, wherein at least one of the one or more pre-defined labels comprises a label indicative of a lunch area.

48. The article of claim 46, wherein at least one of the one or more pre-defined labels comprises a label indicative of a restroom.

49. The article of claim 46, wherein the instructions are further executable by the special purpose apparatus to monitor location information for a pre-defined group of the two or more mobile devices to determine patterns indicative of the one or more pre-defined labels.

* * * * *